March 25, 1952 C. C. CAMPBELL 2,590,376
MINNOW TRANSPORT CONTAINER
Filed Oct. 11, 1945
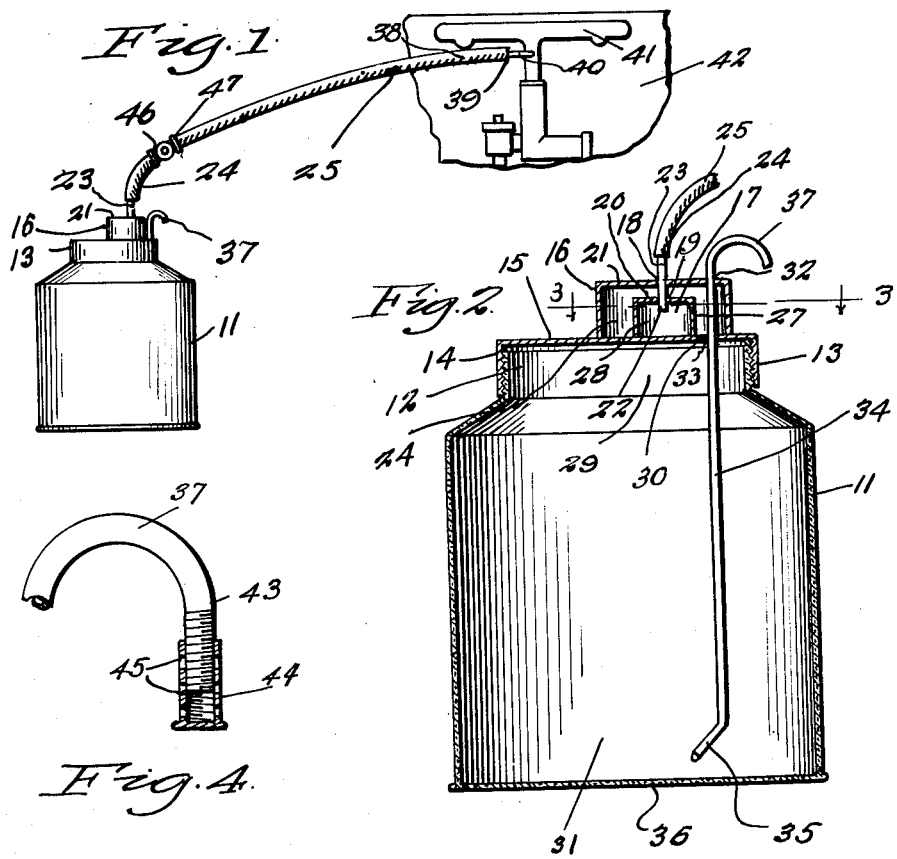
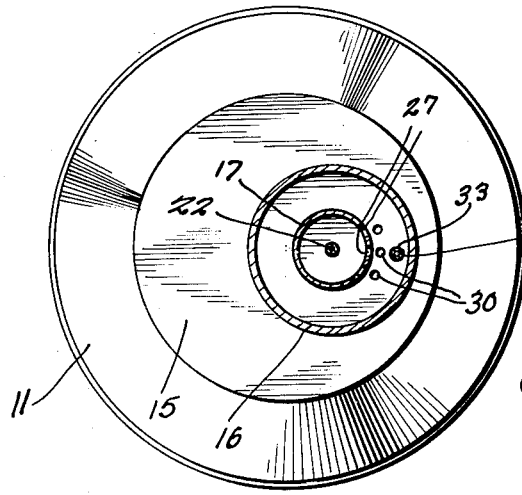
CALVIN C. CAMPBELL Inventor
By Clarence A. O'Brien
and Harvey B. Jacobson
Attorneys

UNITED STATES PATENT OFFICE 2,590,376

MINNOW TRANSPORT CONTAINER

Calvin C. Campbell, Colorado City, Tex., assignor of one-half to Laurence E. Candler, Colorado City, Tex.

Application October 11, 1945, Serial No. 621,818

1 Claim. (Cl. 43—56)

My invention seeks to provide a very simple and inexpensive yet useful and effective container for transporting live bait by motor vehicle.

Another object of this invention is to provide a simple and effective means for aerating water in which live bait is carried on long trips.

A further object of my invention is to provide an aerating container having a suction pipe connected to a motor vehicle manifold and means whereby water in the container can not be drawn from the container into said pipe.

Other features and advantages will become more readily apparent from the following description and the accompanying illustrative drawings in which:

Figure 1 is a diagrammatic view of my invention,

Figure 2 is an enlarged vertical section of my container,

Figure 3 is a sectional view taken on line 3—3 of Figure 2.

Figure 4 is a detail of a modification.

In the above drawings as well as in the specification to follow, the same characters of reference indicate the same parts throughout.

The drawings illustrate my invention which consists of a preferably glass container 11, having a threaded neck 12, on which is screwed the cap 13, sealed by a gasket 14. Fixed on the wall 15, of the cap is an airtight dome 16, within which and also fixed to the wall 15, is a smaller dome 17. Projecting through aligning bores 18 and 19, in the top walls 20 and 21, respectively, of the said domes and fixed thereto is a nipple 22, the outer end 23, of which is adapted to receive the end 24 of a flexible tube 25. The dome 17 is provided with a series of small apertures 27, adjacent the top wall 20, through which air may be drawn into chamber 28, from the space 29 within the neck 12, and the wall 15 is provided with a similar series of openings 30, through which air can be drawn from the interior 31 of the container 11.

Projecting through aligning openings 32 and 33, in the respective walls 15 and 21, is an air intake pipe 34, its angular end 35, extending to near the center of the bottom wall 36, of the container 11, and its outer end 37, being curved down in order not to receive any foreign matter. The end 38, of the tube 25, is adapted to be connected to an outlet 39, of either a windshield wiper tube (not shown) or a nipple 40, of a manifold 41, of a motor car or boat motor 42.

The outer terminal 43 (modification Fig. 4), of the tube 34, may be provided with an elongated screw cap 44, with a series of perforations 45 therein, whereby one or more of the perforations may be closed off by screwing the cap up upon said terminal 43, and by means of which the amount of air allowed to enter the water in the container may be regulated. A valve 46, controlled by a screw 47, may be provided on the tube 25, to control the suction from the container 11.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

In combination with a cover for a minnow bucket, a dome secured to said cover, a smaller dome secured to said cover and positioned within the first dome, said domes having aligned openings for the reception of a vacuum tube, the first dome and the cover having aligned openings for an air inlet tube, and the smaller dome and cover having communicating openings, whereby air passing from the air inlet tube underneath the cover may pass through said communicating openings to the vacuum tube.

CALVIN C. CAMPBELL.

REFERENCES CITED

The following references are of record in the file of this patent:

UNITED STATES PATENTS

| Number | Name | Date |
|---|---|---|
| 224,513 | Burdon | Feb. 17, 1880 |
| 306,307 | Wirz | Oct. 7, 1884 |
| 907,376 | La May | Dec. 22, 1908 |
| 935,338 | Uebler | Sept. 28, 1909 |
| 1,195,999 | Leitch | Aug. 29, 1916 |
| 1,352,648 | Beyer et al. | Sept. 14, 1920 |
| 1,568,730 | Gleason | Jan. 5, 1926 |
| 1,767,324 | Tasker | June 24, 1930 |
| 2,007,326 | Carpenter | July 9, 1935 |
| 2,303,757 | Pierson | Dec. 1, 1942 |
| 2,361,137 | Terry et al. | Oct. 24, 1944 |